(12) United States Patent
Moonen et al.

(10) Patent No.: US 8,274,053 B2
(45) Date of Patent: Sep. 25, 2012

(54) SYSTEM AND METHOD FOR VALVE SEAT GAP EVALUATION

(75) Inventors: Lee B. Moonen, Clarkston, MI (US); John S. Agapiou, Rochester Hills, MI (US); Daniel L. Simon, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 12/711,549

(22) Filed: Feb. 24, 2010

(65) Prior Publication Data
US 2010/0230598 A1    Sep. 16, 2010

Related U.S. Application Data

(60) Provisional application No. 61/158,888, filed on Mar. 10, 2009.

(51) Int. Cl.
*G01J 5/02* (2006.01)
(52) U.S. Cl. .................................................. 250/341.6
(58) Field of Classification Search ................ 250/341.6
See application file for complete search history.

(56) References Cited

U.S. PATENT DOCUMENTS

| | | | | |
|---|---|---|---|---|
| 3,499,153 | A | * | 3/1970 | Stanfill ...................... 250/341.6 |
| 5,796,856 | A | | 8/1998 | Graff et al. |
| 6,155,108 | A | | 12/2000 | Lunn |
| 8,049,901 | B2 | * | 11/2011 | Aoki et al. .................... 356/601 |

FOREIGN PATENT DOCUMENTS

| WO | 2007111156 A1 | 10/2007 |
|---|---|---|
| WO | WO 2008072369 A1 * | 6/2008 |

* cited by examiner

*Primary Examiner* — Constantine Hannaher
(74) *Attorney, Agent, or Firm* — Harness, Dickey & Pierce, P.L.C.

(57) ABSTRACT

A method of detecting a gap between a valve seat insert and a port in a cylinder head may include heating the valve seat insert and the cylinder head and generating a thermal image of the valve seat insert and the cylinder head at an interface between the valve seat insert and corresponding port in the cylinder head housing the valve seat insert. The thermal image may be evaluated to determine the magnitude of a gap between the valve seat insert and the cylinder head based on a temperature at the interface between the valve seat insert and the cylinder head.

20 Claims, 4 Drawing Sheets

SYSTEM AND METHOD FOR VALVE SEAT GAP EVALUATION

CROSS-REFERENCE TO RELATED APPLICATION

This application claims the benefit of U.S. Provisional Application No. 61/158,888, filed on Mar. 10, 2009. The entire disclosure of the above application is incorporated herein by reference.

FIELD

The present disclosure relates to assembly of internal combustion engines, and more specifically to evaluating engine valve seat gaps during assembly.

BACKGROUND

This section provides background information related to the present disclosure which is not necessarily prior art.

Engine assemblies may include valve seat inserts that are pressed into intake and exhaust valve ports. The inserts may abut a corresponding seating surface on the intake and exhaust ports. However, during assembly some inserts may not be completely seated within a port. As a result, gaps may exist between the insert and the seating surface defined by the port. Current methods of detecting these gaps may be time consuming and unreliable.

SUMMARY

An engine valve seat gap evaluation system may include a thermal camera assembly, a fixture having a first end coupled to the thermal camera assembly, and a mirror coupled to a second end of the fixture opposite the first end. The thermal camera assembly may include an infrared sensor. The mirror may be adapted to be located within an engine port to direct infrared radiation from a gap between a cylinder head and a valve seat insert to the infrared sensor.

A method of detecting a gap between a valve seat insert and a port in a cylinder head may include heating the valve seat insert and the cylinder head and generating a thermal image of the valve seat insert and the cylinder head at an interface between the valve seat insert and corresponding port in the cylinder head housing the valve seat insert. The thermal image may be evaluated to determine the magnitude of a gap between the valve seat insert and the cylinder head based on the thermal image at the interface between the valve seat insert and the cylinder head.

The thermal image may be generated by locating a mirror coupled to a first end of a fixture within the port at the interface and reflecting infrared radiation at the interface to an infrared sensor of a thermal camera assembly coupled to a second end of the fixture. The infrared radiation reflected by the mirror may provide a 360° image of the interface to the thermal camera assembly.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
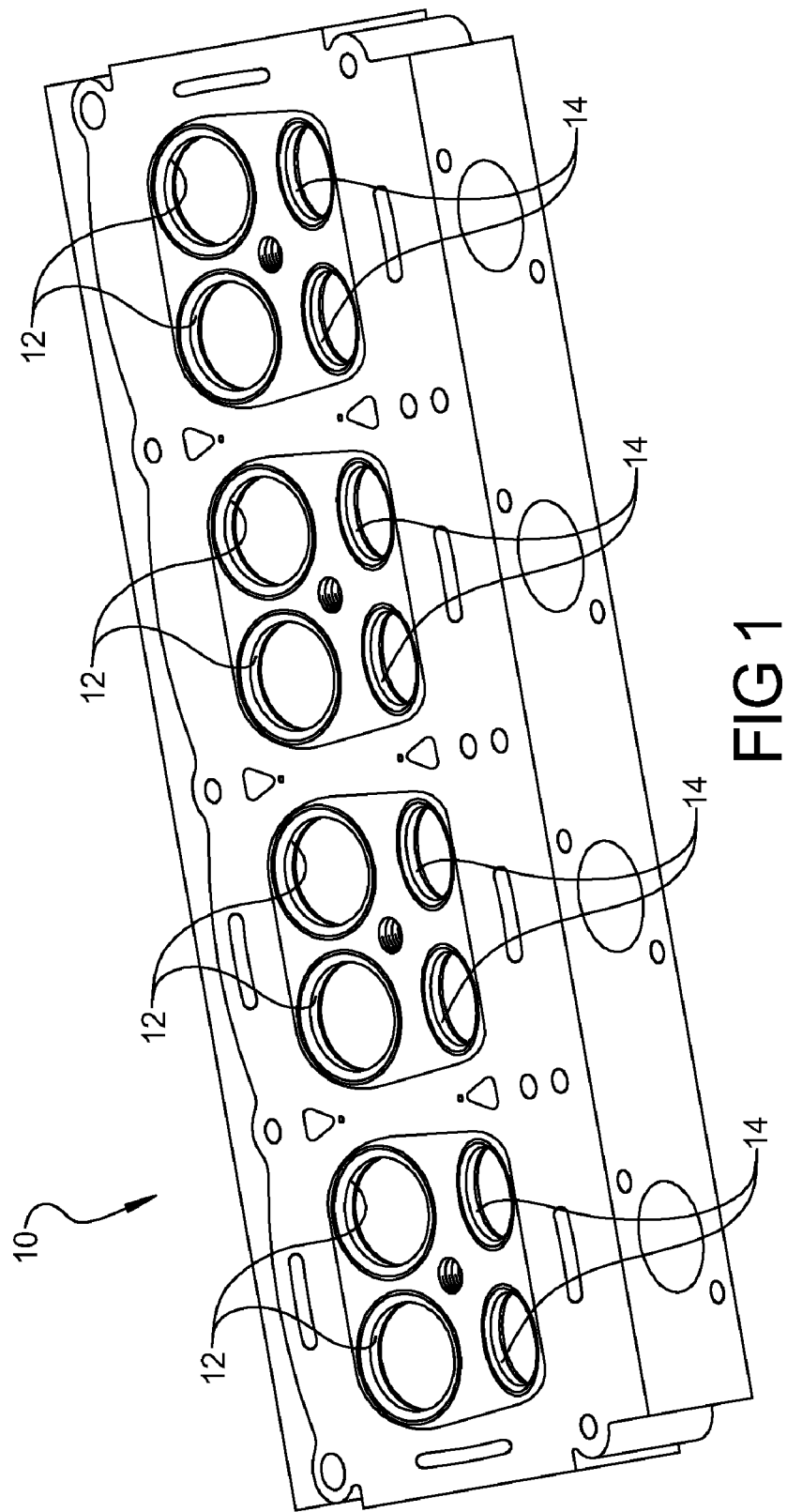
FIG. 1 is a schematic illustration of a cylinder head according to the present disclosure.

The following description is merely exemplary in nature and is not intended to limit the present disclosure, application, or uses. It should be understood that throughout the drawings, corresponding reference numerals indicate like or corresponding parts and features.

Figure 2:
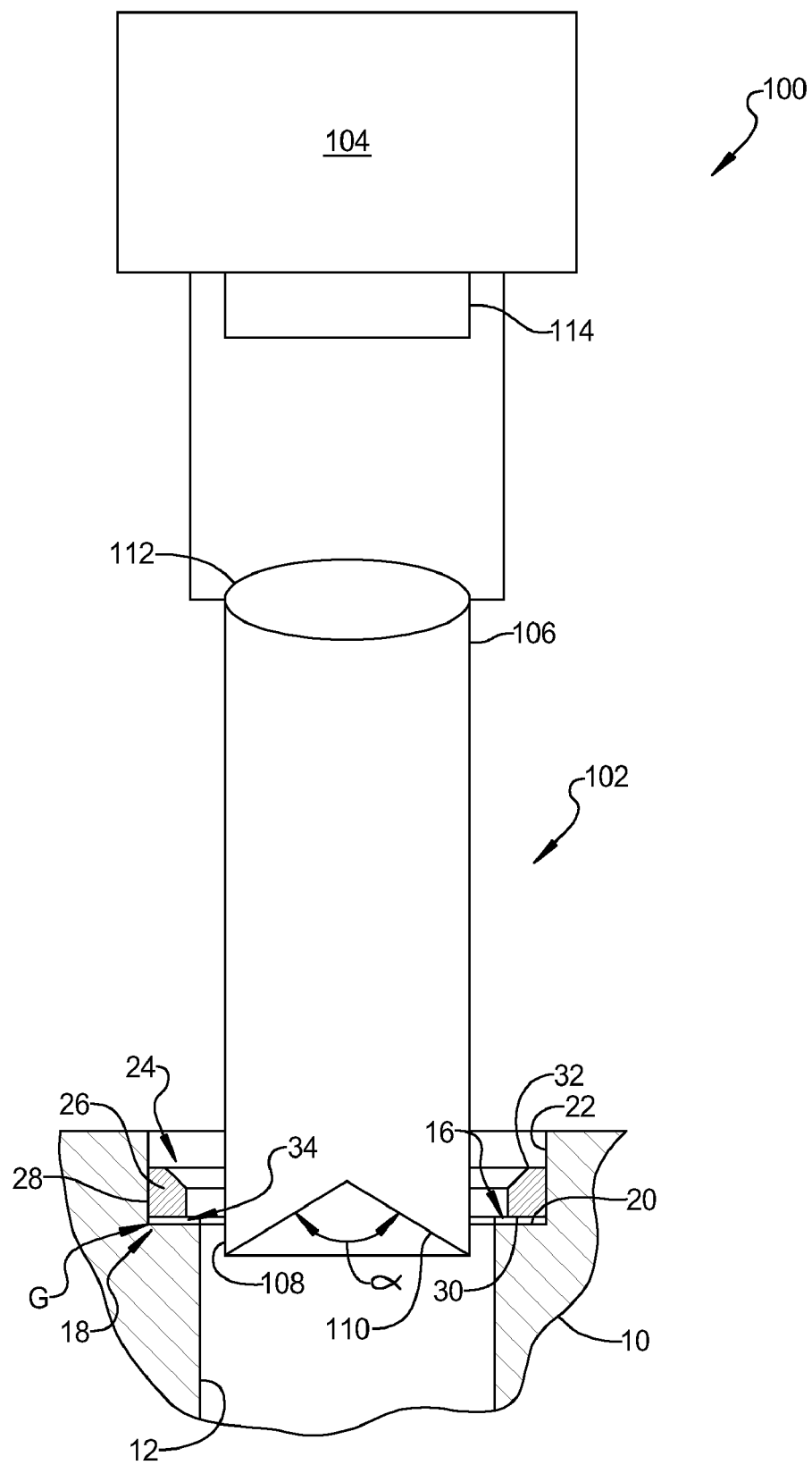
FIG. 2 is a schematic illustration of a portion of the cylinder head of FIG. 1, a valve seat insert and a thermal imaging system according to the present disclosure.

As seen in FIGS. 1 and 2, an engine cylinder head 10 may include intake ports 12 and exhaust ports 14. The following description applies equally to the intake and exhaust ports 12, 14 and will be described with respect to the intake port 12 for simplicity. As seen in FIG. 2, the intake port 12 may include a valve seat 16 defining a stepped region 18. The stepped region 18 may include an axial end surface 20 and an inner radial surface 22.

A valve seat insert 24 may include an annular body 26 located within the stepped region 18. The annular body 26 may include an outer radial surface 28 abutting the inner radial surface 22 of the valve seat 16 and a first axial end surface 30 facing the axial end surface 20 of the valve seat 16. A second axial end surface 32 opposite the first axial end surface 30 may define a valve seating surface for an intake valve (not shown).

During assembly, the valve seat insert 24 is located within the valve seat 16 and the first axial end surface 30 is urged toward the axial end surface 20 of the valve seat 16. However, after assembly the first axial end surface 30 may be offset from the axial end surface 20 of the valve seat 16. The offset may form a gap (G) between the first axial end surface 30 and the axial end surface 20. The gap (G) may be detected using an infrared (IR) thermal imaging system 100 discussed below.

Figure 3:
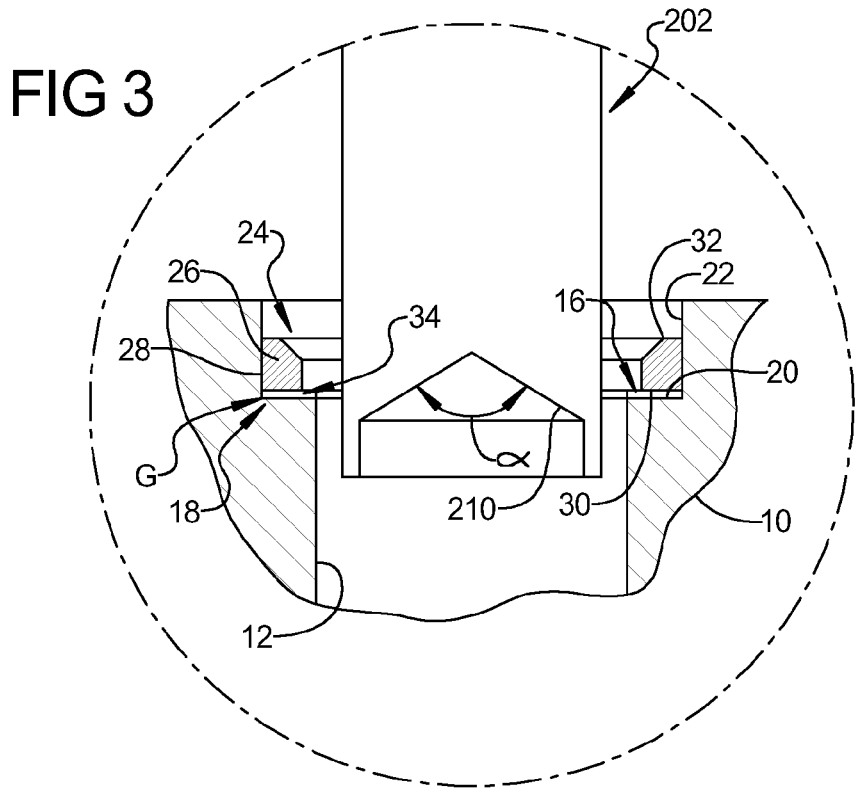
FIG. 3 is a schematic illustration of a portion of the cylinder head of FIG. 1, a valve seat insert and an alternate mirror for the thermal imaging system according to the present disclosure.

The IR thermal imaging system 100 may include an IR transparent fixture 102 coupled to a thermal camera 104. The fixture 102 may include a first end 106 fixed to the thermal camera 104 and a second end 108 having a mirror 110 fixed thereto. The second end 108 of the fixture 102 may have a diameter (D1) less than a diameter (D2) of the intake port 12. Therefore, the mirror 110 may be located within the intake port 12. FIG. 2 illustrates the mirror 110 as an internal prism mirror (or optics). However, as seen in FIG. 3, an external prism mirror 210 may be used in place of the internal prism mirror 110. The present disclosure applies equally to both internal and external prism mirrors.

The internal prism (internal reflection) mirror 110 may be made transparent to IR by using materials including, but not limited to, sapphire, quartz, NaCl, PtSi, or Ge depending on the IR detector wavelength selection (e.g. 3 to 5 microns or 8 to 12 microns). The external prism (exterior reflection) mirror 210 may be incorporated using a metal mirror. The metal external prism mirror 210 may be inserted in a fixture 202 (FIG. 3) transparent to IR similar to the fixture 102 shown in FIG. 2. The metal external prism mirror 210 may be manufactured from aluminum, copper, stainless steel, or other metal materials.

The prism mirror 110, 210 may be used to reflect the emitted radiation from the gap (G) to the IR sensor (or detector) 114. An included angle ($\alpha$) of the prism mirror 110, 210 may be designed to amplify the signal (or the width of the gap (G)) so that at least one pixel is included within the gap (G) if the minimum pixel size of the IR sensor 114 itself is insufficient to separate the intensity of energy within the gap (G). By way of non-limiting example, the included angle ($\alpha$) may be greater than ninety degrees. The thermal camera 104 may include a lens 112 at the first end 106 of the fixture 102 and aligned with the prism mirror 110, 210 and an IR sensor 114 located at the focal point of the lens 112.

During assembly, the cylinder head 10 and the valve seat insert 24 may each be heated to a predetermined temperature. By way of non-limiting example, the predetermined temperature may be between thirty-two and forty-nine degrees Celsius (between ninety and one hundred and twenty degrees Fahrenheit). The predetermined temperature may provide repeatable IR radiation from the cylinder head 10 and the valve seat insert 24, forming a reference for detection of the gap (G). Additionally, the cylinder head 10 and the valve seat insert 24 may be formed from different materials. By way of non-limiting example, the cylinder head 10 may be formed from aluminum and the valve seat insert 24 may be formed from steel. Therefore, the cylinder head 10 may have an emissivity ($\epsilon_{head}$) that is lower than the emissivity ($\epsilon_{insert}$) of the valve seat insert 24. More specifically, the emissivity ($\epsilon_{head}$) of the cylinder head 10 may be an order of magnitude lower than the emissivity ($\epsilon_{insert}$) of the valve seat insert 24.

Figure 4:
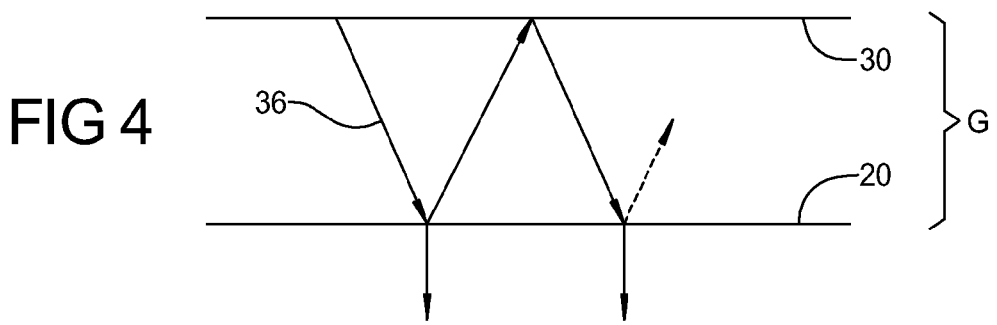
FIG. 4 is a first schematic illustration of the energy transfer between the cylinder head and valve seat insert.
Figure 5:
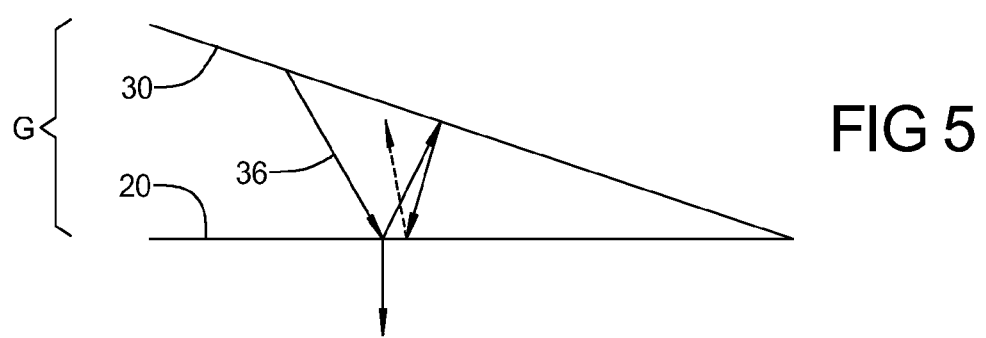
FIG. 5 is a second schematic illustration of the energy transfer between the cylinder head and valve seat insert.

With reference to FIGS. 4 and 5, the cylinder head 10 and the valve seat insert 24 may exchange radiation (or heat) through the gap (G). Since the cylinder head 10 and the valve seat insert 24 are formed from different materials, the radiant energy emitted from the axial end surfaces 20, 30 will be different from one another. The valve seat insert 24 may emit power ($E_1$) and the cylinder head 10 may emit power ($E_2$). FIGS. 4 and 5 illustrate ray traces starting from the first axial end surface 30 of the valve seat insert 24 having power ($E_1$).

The ray 36 strikes the axial end surface 20 of the cylinder head 10 where part of the radiation will be absorbed and part will be reflected. The reflected ray will again strike the first axial end surface 30 where part of the reflected ray will be reflected again and the other part absorbed. This process continues among the two surfaces through the gap (G). Therefore, infinite exchanges between the axial end surfaces 20, 30 will occur resulting in an emissivity ($\epsilon_{GAP}$) of the gap (G) being close to 1.0 due to the concentration of incident energy at the gap (G).

The diagrams of the radiation among two surfaces being either parallel (FIG. 4) with a gap (G) or disposed at an angle (FIG. 5) with gap (G) illustrate the concentration of energy. The high gap emissivity ($\epsilon_{GAP}$) may produce a higher apparent temperature on the thermal camera 104 at the gap (G) relative to the cylinder head 10 and the valve seat insert 24. Even if the temperature for the cylinder head 10 and the valve seat insert 24 are the same, the axial end surfaces 20, 30 will emit radiation across the surfaces within the gap (G) because of the difference in emissivity between the cylinder head 10 and the valve seat insert 24. As discussed above, in the present non-limiting example, the emissivity of the cylinder head 10 is an order of magnitude lower than that of the valve seat insert 24 due to the difference in materials.

The increased concentration of incident energy discussed above will produce increased IR radiation, providing an indication of increased temperature (or higher pixel value) on the thermal camera 104 (even though the temperature may be the same as the predetermined temperature as discussed above). In machine vision vocabulary, the "pixel value" can be used instead of converting the IR radiation to a temperature reading. Just like a digital camera, a thermal image is built up by a number of individual pixels. The minimum size of the pixels produced is dependent on the IR sensor 114. For example, the pixels produced by a Barium Strontium Titanate (BST) detector are 50 microns, while Vanadium Oxide or Amorphous silicon detectors can produce pixels as small as 15 microns.

The thermal camera 104 may therefore be used to provide an image of the interface 34 between the cylinder head 10 and valve seat insert 24 to detect the size of the gap (G). In the present non-limiting example, the fixture 102, 202 may provide a three hundred and sixty degree view of the interface 34. However, the present disclosure is not limited to applications including the mirror 110, 210. In alternate arrangements, a direct optics approach may be used where the thermal camera 104 is used without the prism mirror 110, 210 to provide images of portions of the interface 34 and is rotated relative to the interface 34 to provide a complete three hundred and sixty degree view of the interface 34.

Figure 6:
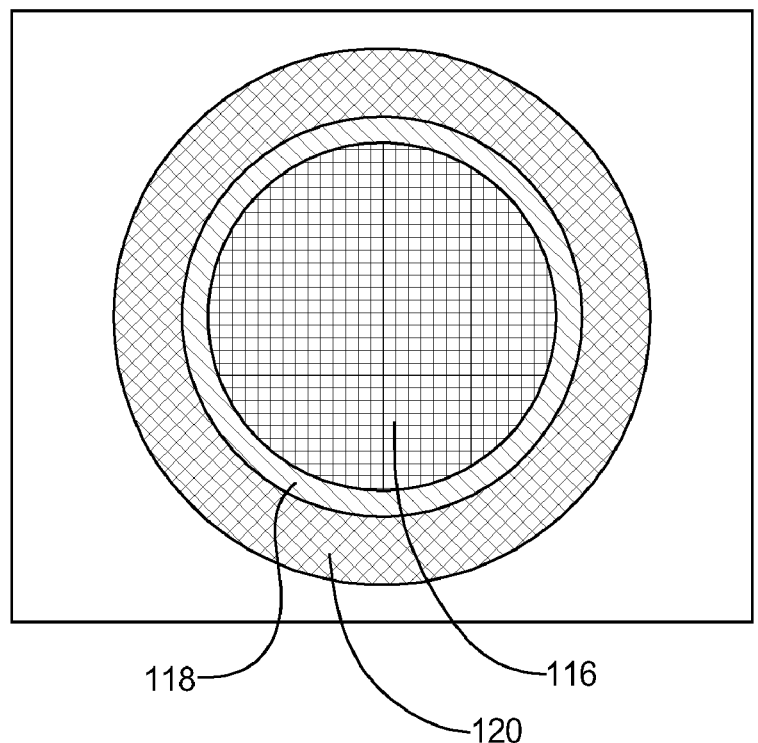
FIG. 6 is a schematic illustration of a thermal image of an interface between the cylinder head and valve seat insert using the thermal imaging system of FIG. 2.

During operation, the prism mirror 110, 210 may be located within the intake port 12. The prism mirror 110, 210 reflects the IR radiation through the lens 112 to the IR sensor 114 where an image may be formed as schematically illustrated in FIG. 6. The first region 116 represents the IR radiation from the valve seat insert 24, the second region 118 represents the IR radiation at the gap (G), and the third region 120 represents the IR radiation from the cylinder head 10. The included angle ($\alpha$) of the prism mirror 110, 210 may provide an increased resolution for detection of the gap (G). The second region 118 may have a different pixel value than the first and third regions 116, 120 due to the higher apparent temperature resulting from the gap emissivity ($\epsilon_{GAP}$).

Figure 7:
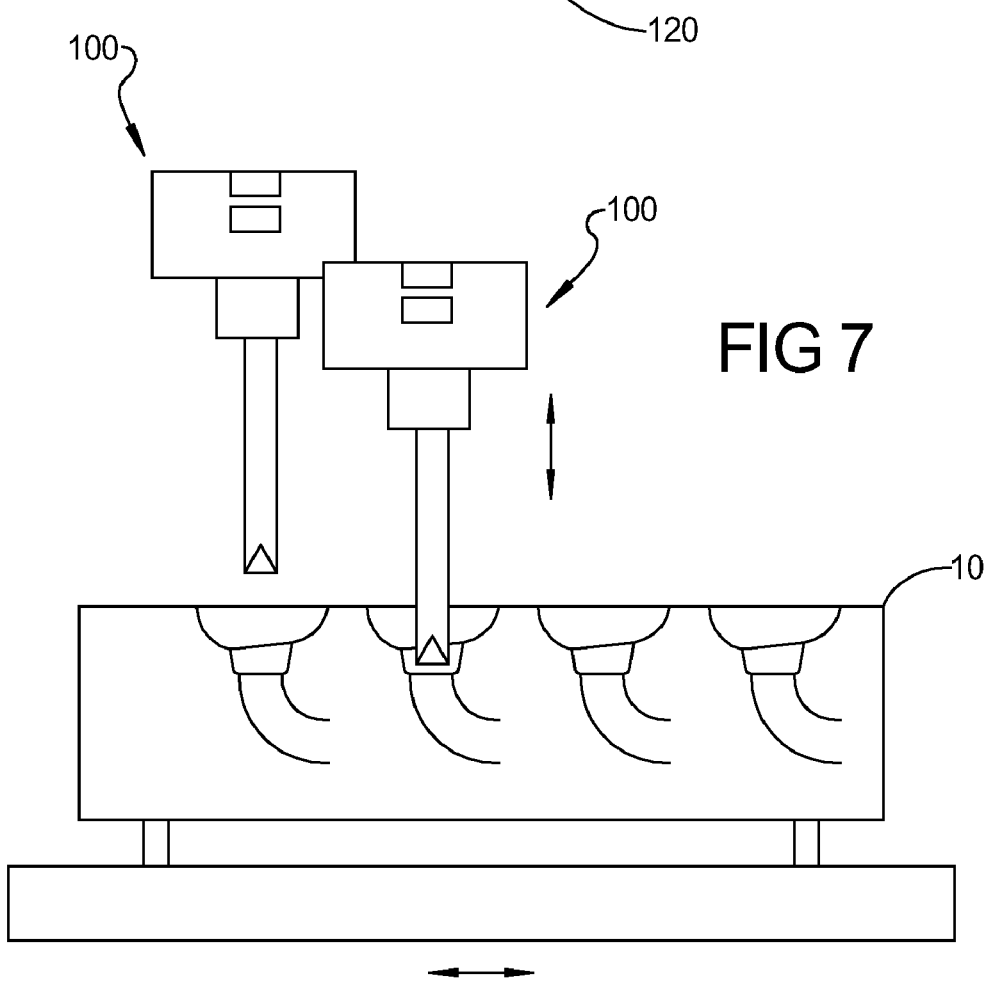
FIG. 7 is a schematic illustration of an automated gap detection line according to the present disclosure.

In one implementation, illustrated in FIG. 7, a station may be located after the hot washer of the cylinder head 10 in an assembly line and may monitor the valve seat interface 34 with the IR thermal imaging system 100 prior to cylinder head assembly. The valve seat insert 24 may be secured to the cylinder head 10 before the cylinder head 10 passes through the hot washer. The hot washer may heat the cylinder head 10 and valve seat insert 24 may be heated to a predetermined temperature (both may be at approximately the same temperature). Alternatively, a different heat source may be used to provide the predetermined temperature.

Two IR thermal imaging systems 100 may be used for the inspection. The cylinder head 10 may travel under the IR thermal imaging system 100 or the IR thermal imaging system 100 may travel above the cylinder head 10 to view each of the valve seat interfaces 34. In addition, the IR thermal imaging system 100 may be located on a robot arm to locate the prism mirror 110, 210 at the valve seat interface 34.

IR thermal imaging systems 100 may be located on each side of the conveyor in a staggered configuration. A first IR thermal imaging system 100 may inspect the intake ports 12 and a second IR thermal imaging system 100 may inspect the exhaust ports 14. The IR thermal imaging system 100 is insensitive to external light sources but an inspection chamber may be added to provide a shrouded area to eliminate external influence on the measurements. Additionally, inspection triggers may be provided by a series of photo-detectors positioned across the powered roller conveyor. As the component translates through the inspection chamber it may interrupt the photo-detectors and thus trigger a specific acquisition/inspection.

IR software with the imaging analysis tools may be used for real time monitoring capabilities to evaluate the pixel value (temperature) range and the pixel value (temperature) measurement zones for collecting and alarming valve seat gap data. Image calibration may additionally be included since the parts may have some temperature variation as they are exiting the hot washer. The cylinder head 10 and valve seat insert 24 assembly may be transported to and from the inspection station using standard line automation.

The system illustrated in FIG. 7 may include two axes, one for the part travel and one for scanning. The system may utilize an image processing script that accesses the surface temperature and through further automation (i.e. conveyors, shuttles etc.) sorts the cylinder head 10 and valve seat insert 24 assemblies accordingly.

The image processing methodology may include separating pixel value (temperature) zones on the surface from actual part features using an image processing software script. The script may include a series of imaging algorithms that isolate the pixel value (or temperature) circular zones (illustrated in FIG. 6) from the remaining image (i.e. surface). The tolerancing criteria may be defined based on pixel value difference (or a temperature difference) at the interface 34 between the cylinder head 10 and the valve seat insert 24. The acceptability of a gap size at a given position may be determined based upon a predetermined difference in pixel value (or temperature difference).

Typically, pixel values may range from value 0 when an image is pure black, to pixel value 255 when an image is pure white. This produces 2 to the 8th power in pixel values (2, 4, 8, 16, 32, 64, 128, 256). When dealing with pixel values within a thermal infrared image (grey scale palette) simple threshold values can be used to eliminate all parts of the image that are under a certain pixel value. By way of non-limiting example, the resolution of the IR thermal imaging systems 100 may be set so that any temperature difference at the interface 34 indicates an unacceptable gap size.

An exemplary gap detection process may include first acquiring an original image from the IR thermal imaging system 100 to calibrate the system for proper positioning of the IR thermal imaging system 100. A specific valve seat may then be located under the IR sensor. The adapter in FIG. 2 may then be inserted in the corresponding porting section to acquire the emitted radiation or an image of the part surface as viewed under the IR camera. In pre-selected regions of interest, a pattern recognition algorithm may then be used to locate known features on the image to establish an orientation, a scaling factor, and a coordinate system that are all relative to the actual scanned surface. The image may then be scaled to appropriately set up the pixel resolution to the actual workpiece gap section of measure. This generally provides for defining the location of the gap (G) on the surface and also establishing the specification regions using different circular tolerance for control purposes. This may be achieved by establishing a Region of Interest (ROI) around an area of the image for which a search is performed for a specified range of pixel values. Next, the various regions of interest, such as the unique zonal tolerance requirements of a gap (G), may be specified relative to the previously defined coordinate system.

By way of non-limiting example, if all pixels of value 0 to 168 are changed to value 0 in the computer software, the resulting image will be just the gap itself if a gap exists. Since the gap is the best emitter in the image, it will have the highest pixel value that could be in the range of 172 to 255 in value. The computer can then change all of these bright pixels to a value, such as 240. The software can then add up the 240 value pixels to determine gap size.

While discussed with respect to gap detection between a cylinder head 10 and a valve seat insert 24, it is understood that the present disclosure applies equally to gap detection between any variety of other engine components. Further, it is understood that the present disclosure has applications outside of engine assembly.

What is claimed is:

1. An engine valve seat gap evaluation system comprising:
a thermal camera assembly including an infrared sensor;
a fixture having a first end coupled to the thermal camera assembly; and
a mirror coupled to a second end of the fixture opposite the first end and adapted to be located within an engine port to direct infrared radiation from a gap between a cylinder head and a valve seat insert to the infrared sensor.

2. The system of claim 1, wherein the mirror forms a conical shape and provides a complete 360 degree view of the gap between the valve seat insert and the cylinder head.

3. The system of claim 2, wherein the mirror defines an included angle of at least 90 degrees at a peak thereof.

4. The system of claim 1, wherein the mirror includes an infrared transparent internal prism mirror that reflects the infrared radiation to the infrared sensor.

5. The system of claim 1, wherein the mirror includes a metallic external prism mirror that reflects the infrared radiation to the infrared sensor.

6. The system of claim 1, wherein the fixture is transparent to infrared radiation.

7. The system of claim 1, wherein the system is adapted to evaluate a thermal image of the gap generated by the infrared sensor and determine the magnitude of the gap via image analysis.

8. A method of detecting a gap between a valve seat insert and a port in a cylinder head comprising:
heating the valve seat insert and the cylinder head;
generating a thermal image of the valve seat insert and the cylinder head at an interface between the valve seat insert and corresponding port in the cylinder head housing the valve seat insert; and
evaluating the thermal image to determine the magnitude of a gap between the valve seat insert and the cylinder head based on a temperature at the interface between the valve seat insert and the cylinder head.

9. The method of claim 8, further comprising indicating an unacceptable gap size when the thermal image indicates a temperature difference between the gap region and one of the valve seat insert and the cylinder head.

10. The method of claim 8, wherein generating the thermal image includes locating a mirror coupled to a first end of a fixture within the port at the interface and reflecting infrared radiation at the interface to an infrared sensor of a thermal camera assembly coupled to a second end of the fixture.

11. The method of claim 10, wherein the infrared radiation reflected by the mirror provides a 360 degree image of the interface to the thermal camera assembly and the mirror includes a conical shape defining an included angle of at least 90 degrees at a peak thereof to magnify the thermal image of the interface.

12. The method of claim 10, wherein the mirror includes an infrared transparent internal prism mirror that reflects the infrared radiation at the interface to the infrared sensor.

13. The method of claim 10, wherein the mirror includes a metallic external prism mirror that reflects the infrared radiation at the interface to the infrared sensor.

14. The method of claim 10, wherein the fixture is transparent to infrared radiation.

15. The method of claim 8, wherein the evaluating includes evaluating pixel values of the thermal image to determine the gap magnitude.

16. The method of claim 8, further comprising assembling the valve seat insert to the cylinder head before the heating.

17. The method of claim 16, wherein the heating includes passing the cylinder head and valve seat insert through a hot wash station.

18. A method of detecting a gap between a valve seat insert and a port in a cylinder head comprising:
heating the valve seat insert and the cylinder head;
locating a mirror coupled to a first end of a fixture within the port at an interface between the valve seat insert and corresponding port in the cylinder head housing the valve seat insert and reflecting infrared radiation around an entire circumference of the interface to an infrared sensor of a thermal camera assembly coupled to a second end of the fixture;
generating a thermal image of the interface via the thermal camera assembly; and
evaluating the thermal image to determine the magnitude of a gap between the valve seat insert and the cylinder head based on a temperature at the interface between the valve seat insert and the cylinder head.

19. The method of claim 18, further comprising indicating an unacceptable gap size when the thermal image indicates a temperature difference between the gap region and one of the valve seat insert and the cylinder head.

20. The method of claim 18, further comprising assembling the valve seat insert to the cylinder head before the heating and the heating includes passing the cylinder head and valve seat insert through a hot wash station.

* * * * *